United States Patent [19]
Barber

[11] 3,936,894
[45] Feb. 10, 1976

[54] ARTIFICIAL NEST FOR HATCHING BEES

[76] Inventor: Theodore C. Barber, P.O. Box 5, Orovada, Nev. 89425

[22] Filed: Nov. 7, 1974

[21] Appl. No.: 521,653

[52] U.S. Cl. .................................................. 6/11
[51] Int. Cl.² ......................................... A01K 47/04
[58] Field of Search ........................... 6/11; 85/50 R

[56] References Cited
UNITED STATES PATENTS

| | | | |
|---|---|---|---|
| 3,191,199 | 6/1965 | Barnes | 6/11 |
| 3,267,497 | 8/1966 | Dority | 6/11 |
| 3,362,449 | 1/1968 | Barwick et al. | 85/50 R |

Primary Examiner—Louis G. Mancene
Assistant Examiner—J. Q. Lever
Attorney, Agent, or Firm—Wells, St. John & Roberts

[57] ABSTRACT

An assembly of a multiplicity of thin wood boards each having parallel grooves in one face from edge to edge thereof, and the opposite face being ungrooved, is held together by one or more rods extending through the several boards, the grooved face of each board facing the smooth face of an adjacent board. At the ends of the assembly, cupped spring plates engage the outermost surfaces of the boards and nuts threaded on the rod ends apply pressure on the plates to hold the board surfaces in contact. There is a flexible thin strip of adhesive covering one end of each of the grooves and adhered to the board edges at that end of the grooves and to the adjacent side edges of the boards.

4 Claims, 4 Drawing Figures

ARTIFICIAL NEST FOR HATCHING BEES

BACKGROUND OF THE INVENTION

Certain wild bees for example, Megochile Rotundata, have been used to facilitate the pollination of alfalfa blossoms for the production of alfalfa seed. These bees appear to confine their pollen seeking activities to a small area surrounding their nests, where the eggs are laid and hatched. I have found that in order to provide nests wherein the bees may deposit their eggs in sufficient quantities to be effective, when hatched, to pollenize fields of alfalfa, it is desirable to have a nesting unit of a portable nature with capacity for holding several hundred eggs. These units are put in the field where the bees hatch and perform their pollenizing of the alfalfa.

It has been disclosed in the Barnes U.S. Pat. No. 3,191,199 that such portable units can be made by providing boards with grooves on one side and stacking the boards so that these grooves are closed by the ungrooved surface of an adjacent board. This patent discloses, so far as applicant knows, the most practical artificial nest for the desired wild bees, that, prior to my invention, has been known. Other prior bee nest devices are disclosed in the Barnes patent and in the patents to Green U.S. Pat. No. 2,593,296, Lawther U.S. Pat. No. 200,549 and Aspinwall U.S. Pat. No. 397,046. These are the only patent prior art that we know about. A search of the Patent Office records has not been made.

In wild bee nests of the type disclosed in the Barnes U.S. Pat. No. 3,191,199 it is necessary to have the grooves capable of being cleaned out after the larvae have hatched. It is also necessary to have the grooves in which the bees lay their eggs closed at one end.

It is the purpose of this invention to provide an improved nest made up of boards grooved on one side face, wherein all of the grooved boards are alike except for one end board which has no grooves in either face, and to provide a flexible sealing cover for one end of each of the grooves which cover is sealed to the edges of individual grooved boards over one end of the grooves and to the adjacent edges of the boards so that parasites cannot enter the grooves from their closed ends.

It is also a purpose of the invention to provide a novel clamping and supporting means capable of pressing the several boards together to make a rigid unit. The clamping means comprises a bolt rod and end plates that are readily removable and a flexible sealing cover that is also readily removable to leave the several boards free of each other for individual cleaning and reuse.

GENERAL DESCRIPTION

Figure 1:
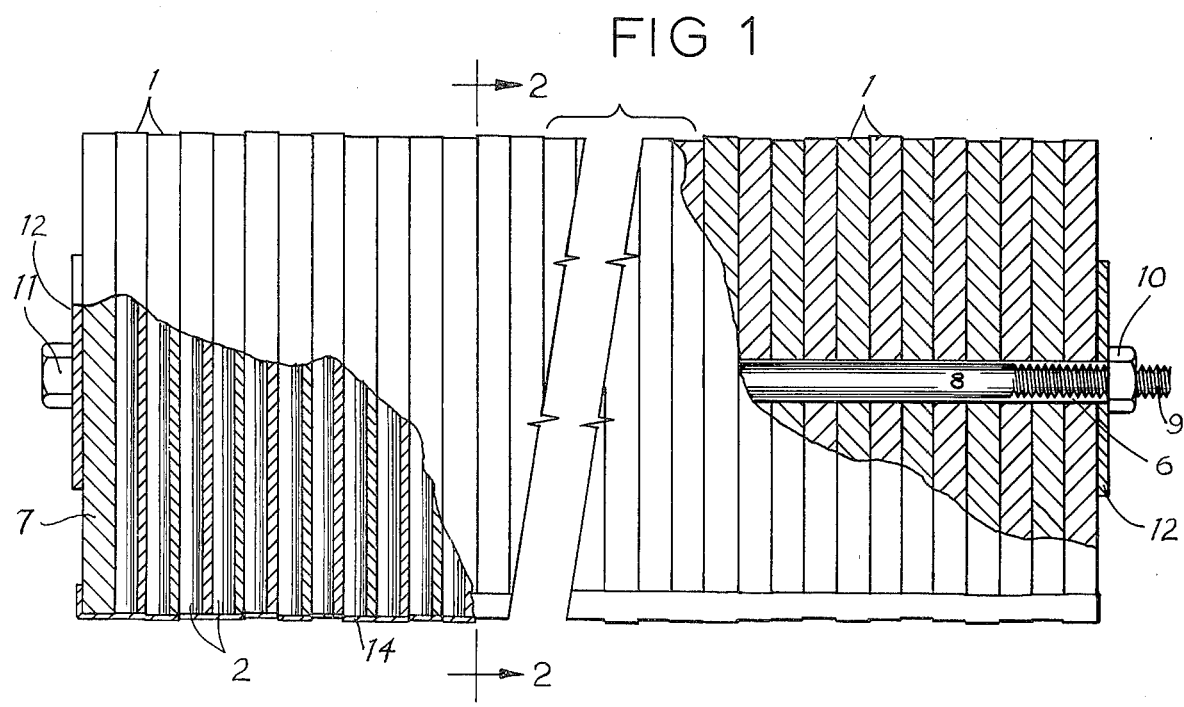
FIG. 1 is a view in side elevation of the bee nest with parts broken away.
Figure 2:
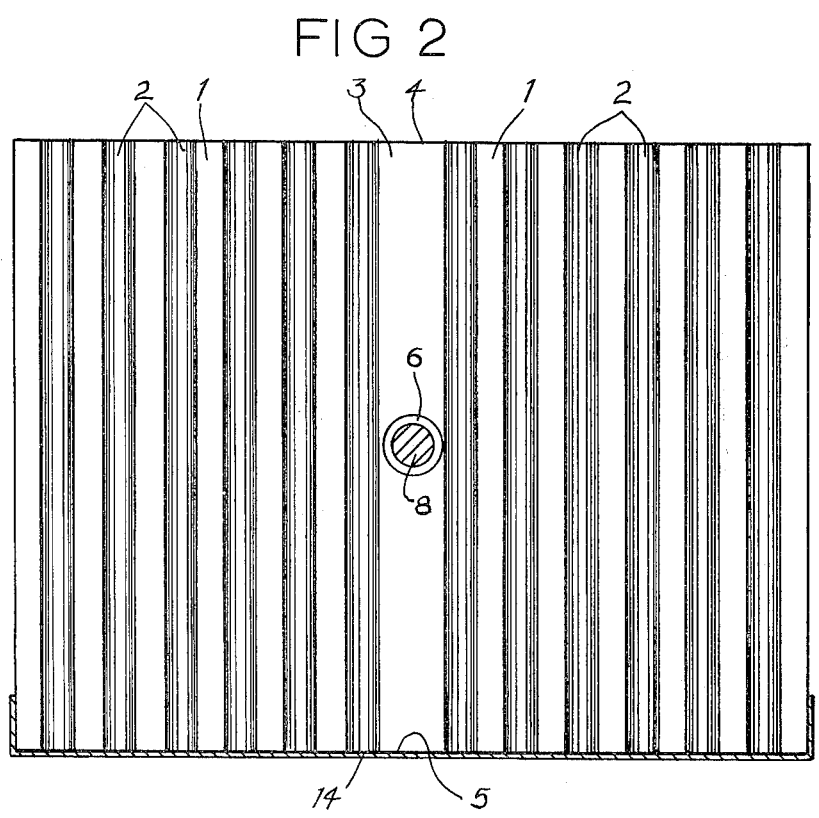
FIG. 2 is a sectional view on the line 2—2 of Fig. 1.
Figure 3:
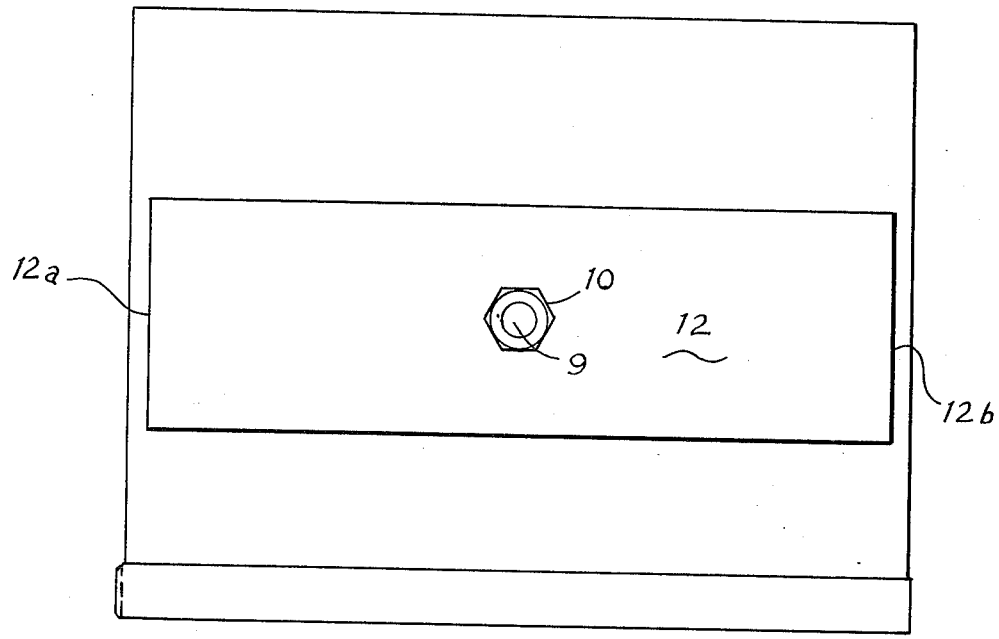
FIG. 3 is an end view of the bee nest.

The artificial nest for hatching bees is made up primarily of a plurality of substantially alike boards 1 of wood that are three-eights of an inch thick. These boards are cut from planed boards into pieces measuring about four inches along the grain of the wood. In one face of each of the boards 1 spaced grooves 2 are cut, the grooves running in the direction of the wood grain and being three-sixteenths of an inch across and spaced three-sixteenths of an inch across and spaced three-sixteenths of an inch apart. The depth of the grooves is about three-sixteenths of an inch and the bottom 2b of each groove is rounded as shown. In grooving the boards 1, a section 3 about ½ inch wide midway between the side edges 4 and 5 of each board 1 is not grooved but is provided with an aperture 6 at its center.

Figure 4:
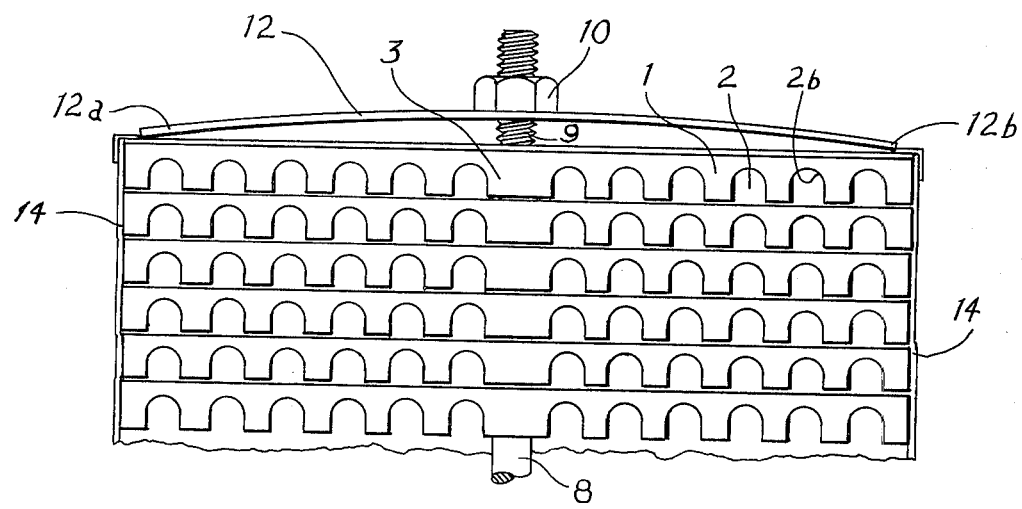
FIG. 4 is a fragmentary plan view of the bee nest with the holding means loosened to indicate how the end plates press against the end boards of the nest.

The several grooved boards 1 are assembled as shown in FIG. 1 with one end board 7 which is not grooved at all but otherwise essentially the same dimensions as the boards 1. A steel rod 8 is extended through the several boards 1 and the end board 7. This rod is provided with threads 9 at one end to receive a nut 10. A head 11 is provided at the other end of the rod 8. Two steel end plates 12 are placed on the rod 8 to engage the end board 1 and the end board 7. These plates are rectangular and elongated crosswise with respect to the grooves 2 and reach across all the grooves 2. The plates 12 are slightly curved as shown in FIG. 4 so that the ends 12a and 12b of the plate 12 will press the side portions of the boards 1 and 7 tightly against the adjacent boards. The plates 12 are sufficiently resilient to maintain the boards tightly against each other when they are exposed in the field and alternately subjected to midday sun and evening coolness. It is important that the boards have this pressure to keep their surfaces sealed together so that parasites are kept from entering between boards.

The grooves 2 go all the way across the boards 1 so it is necessary to close one end of each groove to make the groove nest attractive to the bee as a place to deposit its eggs. I find that the closure of the end of the groove must be a seal that is capable of keeping out the parasites that attract the larvae of the bee. So I provide a flexiable thin sheet which is opaque, as the seal to close the end of the groove. For this I use a metallized sheet material 14, such as lead or aluminum foil, surfaced with a contact adhesive. I extend this material over one end of each of the boards 1 and 7 to cover one end of each of the grooves 2 and I lap the flexiable sheet over the adjacent side edges 4 and 5 of the boards 1 and 7. The thin flexible sheet material 14 is not necessarily metallic as other sheet material having similar characteristics could be adhered to the assembled boards 1 and 7. It is essential for assurance of sealing the ends of the grooves that this sealing sheet be sufficiently soft and flexible to seal to the wood around the groove end and thus block out light and to keep parasites from the bee eggs that have already been laid in the groove 2. The groove is open at the end opposite that one covered by the sheet for entrance of the bees and the bees can police this entrance quite will to keep the parasites away.

I find it is possible to assemble about 100 boards 1 into a substantially rigid block on the rod 8. This block may be set in the field where the bees can have access to deposit their eggs. For storage, the blocks can be stacked flat against each other with the grooved side of one block against the ungrooved side 5 of an adjacent block. The only ungrooved board in a block is the end board 7.

Having described my invention I claim:

1. A nesting structure for wild bees, comprising:
   a plurality of parallel engaging wooden boards forming a stack;
   a plurality of parallel grooves formed in one side surface of each board running from one side edge of the board to an opposite side edge in the direction of the wood grain;
   wherein the remaining side surface of each board is planar and ungrooved with each grooved surface resting against a planar side of an adjacent board to form a plurality of closed channels opening at opposite ends of the stacked boards;
   an aperture formed through each board from the grooved surface to the planar surface forming an open bore extending through the stack;
   a supporting rod received through the open bore with ends protruding from the stack;
   spring clamp bars at the rod ends for engaging the stack at opposite ends thereof; and
   means on the rod for deflecting the spring clamp bars against the stack ends to secure the boards therein.

2. The wild bee nesting structure as defined by claim 1 further comprising:
   a flexible sheet covering the open channels at one end of the boards; and
   an adhesive securing the flexible sheet to the one end of the boards to prevent communication between the groove at said one end of the boards.

3. The device defined by claim 1 wherein said spring clamp bars are formed of resilient curved steel bars having concave faces facing end boards of the stack and receiving the supporting rod through apertures therein; and wherein said means is comprised of:
   a head on one end of the rod against a convex side of one bar; an opposite end of the rod being threaded to receive a nut; and
   a nut threaded on the rod at said opposite end to force the bars toward each other and flex the bars against the stack therebetween bias the boards together to prevent communication between the grooves at the side surfaces.

4. The device defined by claim 2 wherein the flexible sheet material comprises a metal foil with an adhesive coated over one entire side surface thereof to enable adhesion to an entire side of the stack.

* * * * *